United States Patent
Gioutsos et al.

(10) Patent No.: US 6,882,914 B2
(45) Date of Patent: Apr. 19, 2005

(54) VEHICLE OCCUPANT SAFETY SYSTEM

(75) Inventors: Tony Gioutsos, Novi, MI (US); Daniel N. Tabar, Canton, MI (US)

(73) Assignee: Key Safety Systems, Inc., Sterling Heights, MI (US)

(*) Notice: Subject to any disclaimer, the term of this patent is extended or adjusted under 35 U.S.C. 154(b) by 0 days.

(21) Appl. No.: 10/266,168

(22) Filed: Oct. 7, 2002

(65) Prior Publication Data

US 2004/0068355 A1 Apr. 8, 2004

(51) Int. Cl.[7] .................. G06F 7/00; G06F 17/00
(52) U.S. Cl. .................. 701/45; 701/46; 701/47; 180/274; 180/282; 180/735; 180/734; 180/742; 180/731; 180/732; 340/436; 307/10.1; 280/730.1; 280/730.2; 280/734; 280/735
(58) Field of Search .................. 401/45, 46, 47, 401/1; 180/274, 282, 735, 734, 742, 731, 732; 340/436; 307/10.1; 280/730.1, 730.2, 734, 735, 748

(56) References Cited

U.S. PATENT DOCUMENTS

| | | | | |
|---|---|---|---|---|
| 5,631,834 A | * | 5/1997 | Tsurushima et al. | 701/45 |
| 5,767,766 A | * | 6/1998 | Kwun | 340/436 |
| 6,305,709 B1 | * | 10/2001 | Okada | 280/735 |
| 6,438,475 B1 | | 8/2002 | Gioutsos et al. | |
| 2002/0147535 A1 | * | 10/2002 | Nikolov | |
| 2003/0051530 A1 | * | 3/2003 | Eisele et al. | 73/12.09 |

* cited by examiner

Primary Examiner—William A. Cuchlinski, Jr.
Assistant Examiner—Olga Hernandez
(74) Attorney, Agent, or Firm—Lonnie Drayer; John Carlson

(57) ABSTRACT

A vehicle occupant safety system includes a crash severity determination system and one or more vehicle occupant safety devices. The crash severity determination system includes at least one crash sensor which generates a crash signal based upon the severity of the crash. A continuously variable crash severity output signal is generated based upon the crash signal from the crash sensor. Generally, for a given crash type, the crash severity signal is inversely proportional to the amount of time between the beginning of the crash and when the crash signal crosses a threshold. This continuously variable crash severity signal is sent to the vehicle occupant safety devices, which activate proportionally to the crash severity signal.

14 Claims, 2 Drawing Sheets

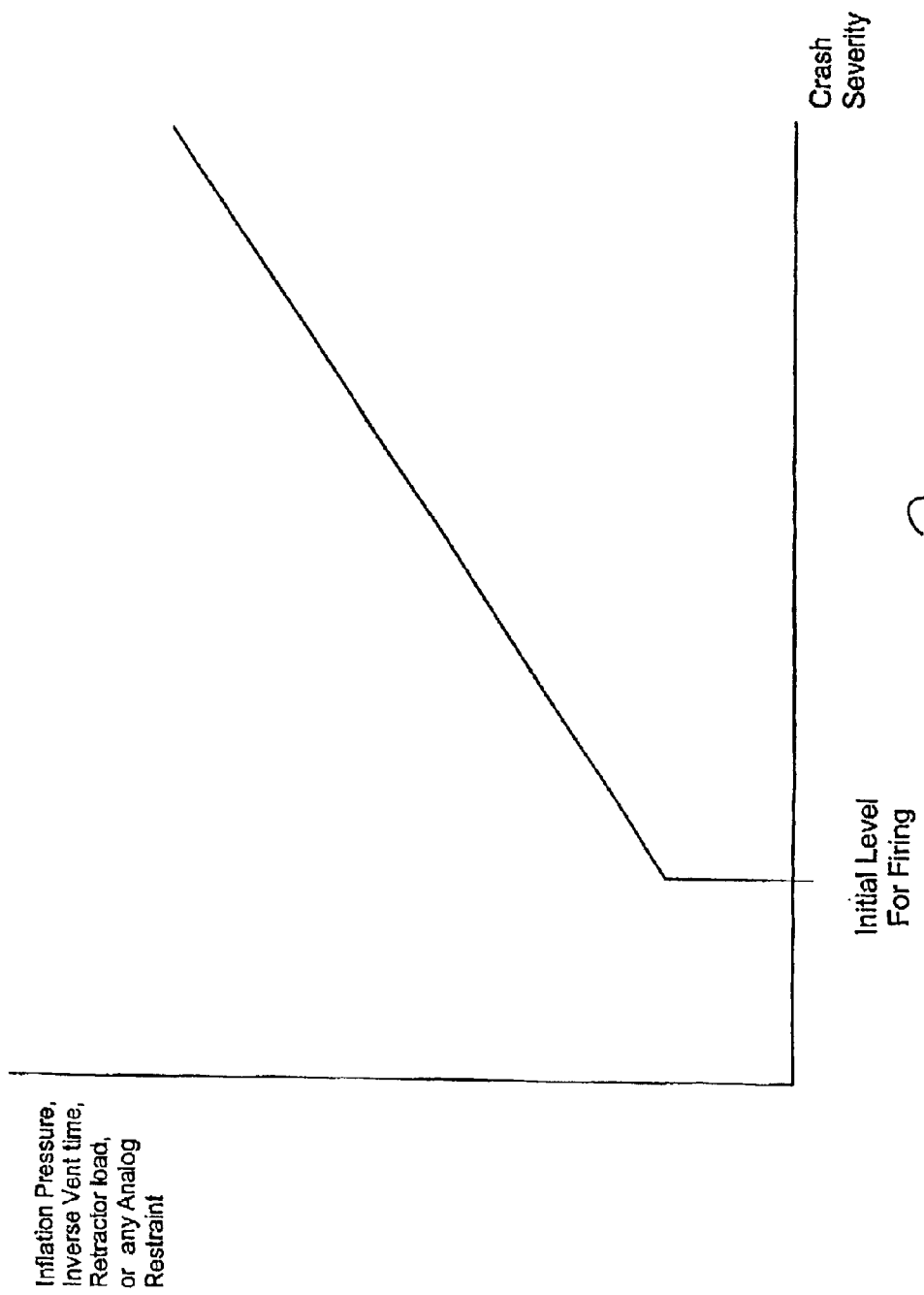

VEHICLE OCCUPANT SAFETY SYSTEM

BACKGROUND OF THE INVENTION

The present invention relates generally to a vehicle occupant safety system and more particularly to a crash severity determination system having an algorithm which provides a continuously variable or "analog" output for use with continuously variable vehicle occupant safety devices.

Generally, vehicle occupant safety systems include a crash severity determination system having a crash sensor, such as an inertial sensor. The crash determination system determines the severity of the crash and crash type based upon signals from the crash sensor. The crash severity determination system then determines a "stage" of activation for the vehicle occupancy safety devices. Generally, air bags with two stages of potential activation are known. Thus, the crash severity determination system must quickly decide whether to: a) not activate the air bag; b) activate the air bag stage 1; or c) activate the air bag stage 2. Since there is a large difference between each of the three stages (not firing, stage 1, stage 2), it is critical that the crash severity determination system quickly determines the proper severity of the crash and the proper activation stage. A slight error in the determination of crash severity in a discrete output crash severity determination system may result in a determination that the next higher or next lower stage has been reached. The result will be a significantly higher or significantly lower activation force from the vehicle occupant safety devices. For example, there is a significant difference between an airbag not firing and an airbag firing stage 1, and there is a significant difference between an airbag firing stage 1 and an airbag firing stage 2.

More recently, vehicle occupant safety devices, such as air bags and other active restraints, have been developed with continuously variable or "analog" activation levels. For example, some air bag inflators can provide a continuously variable inflation force, rather than just one or two stages. Some seat belt retractors can provide a continuously variable retraction force. What is needed therefore, is a crash severity determination system which takes advantage of the new continuously variable vehicle occupant safety devices.

SUMMARY OF THE INVENTION

The present invention provides a vehicle occupant safety system that activates vehicle occupant safety devices in a continuously variable manner based upon crash severity. The vehicle occupant safety system includes a crash severity determination system that provides a continuously variable or "analog" crash severity output, which is generally based upon change in velocity and crash type. Thus, with the present invention, the vehicle occupant safety devices can be actuated with the proper amount of force. Further, any slight error in calculating the crash severity is not critical since it will only proportionally affect the output.

Preferably, the crash determination system includes a crash sensor which generates a crash signal. A CPU compares the crash signal to a threshold and determines the threshold crossing time, i.e. the length of time from a beginning point to when the crash signal reached the threshold ("crash time"). The change in velocity experienced in the crash is a function of the inverse of this length of time and of crash type. The crash severity signal is a function of the change in velocity and the crash type. Thus, in the present invention, the output of the crash severity determination system is a signal that is a function of the inverse of crash time and of crash type. The output of the crash severity determination system is continuously variable, as that crash time would be continuously variable. This continuously variable output is sent to one or more of the vehicle occupant safety devices which each activate at a continuously variable level precisely in response to the crash severity signal.

As indicated, the output of the crash severity determination system is also based upon a determination of crash type. As is known, crash type can be determined from the crash sensors, such as by analyzing the shape of the output from an accelerometer. In the present invention, the output of the crash severity system may vary based upon crash type, but for a given crash type, the output of the crash severity determination system is a function of the change in velocity, which is a function of the inverse of crash time.

BRIEF DESCRIPTION OF THE DRAWINGS

Other advantages of the present invention will be readily appreciated as the same becomes better understood by reference to the following detailed description when considered in connection with the accompanying drawings therein:

FIG. 2 is a graph of the output of the crash severity determination system of FIG. 1.

DETAILED DESCRIPTION OF A PREFERRED EMBODIMENT

Figure 1:
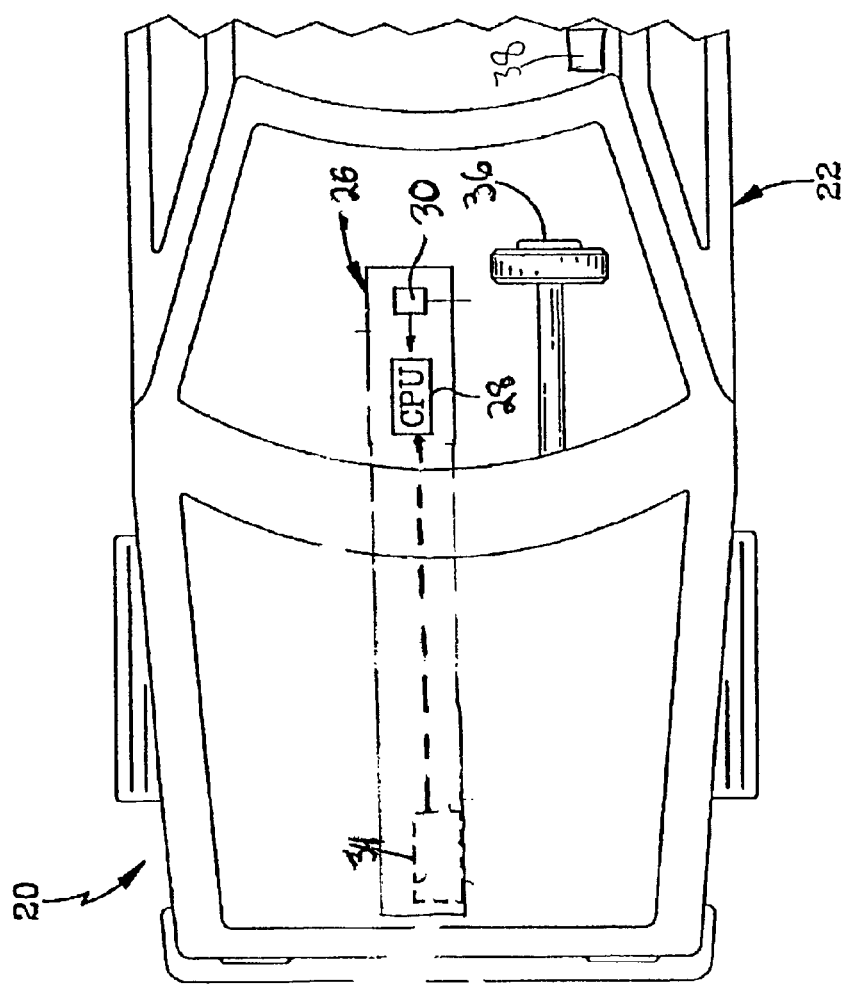
FIG. 1 is a schematic of the vehicle occupant safety system of the present invention installed in a vehicle.

A vehicle occupant safety system 20 is shown schematically in FIG. 1 installed in a vehicle 22. The vehicle occupant safety system 20 generally includes a crash severity determination system 26 having a controller or CPU 28 and at least one crash sensor 30. The crash sensor 30 may be an inertial sensor, such as an accelerometer or a ball-in-tube sensor, or any other inertial sensor or other crash sensor. The crash determination system 26 may optionally include a second crash sensor 34, which again may be an inertial sensor, such as an accelerometer or ball-in-tube sensor, and/or may include radar.

As will be described below, the crash severity determination system 26 generates an analog or continuously variable crash severity signal which is continuously variable from a minimum to a maximum. The crash severity signal is sent to at least one vehicle occupant safety device, such as an airbag 36 or other active restraint 38, such as a seat belt retractor, side airbag, seat bolsters, etc. The airbag module 36 is preferably actuatable in a continuously variable or "analog" manner. In other words, the amount of force with which the airbag module 36 deploys is not simply in discrete stages, but is continuously variable from its minimum actuation force to its maximum actuation force based upon the crash severity signal. Some airbag modules 36 are so activated by continuously varying the venting of the actuator; however, any technique may be used. Similarly, the active restraint 38 is also preferably continuously variable from its minimum actuation force to its maximum actuation force based upon the crash severity signal.

The controller is preferably a CPU 28 with appropriate memory, hardware and software to perform the functions described herein, but alternatively could be a hardwired electronic circuit. Generally, the CPU 28 determines when to start calculating crash time, such as by determining when the crash signal from the crash sensor 30 (and/or optional crash sensor 34) crosses a first threshold (such as 2 Gs), which could be considered the "beginning of the crash." The processor 28 determines a "crash time" from when the crash signal from the crash sensor 30 (and optionally crash sensor 34) crosses a second threshold. A "threshold crossing time" (or "TCT") for each sensor 30, 34 is a function of each respective crash time. The processor 28 also determines crash type (i.e., frontal crash, car-to-car, pole, bumper override, etc.) based upon the crash signal from the crash sensor 30.

The processor 28 then determines a change in velocity as a function of the TCTs (if more than one) and crash type as follows (for N crash sensors):

$$\Delta v = f(1/TCT_1, 1/TCT_2 \ldots 1/TCT_N, \text{Crash Type})$$

The function f will vary based upon the types of sensors, locations of the sensors and the type of vehicle.

The crash severity signal from the crash severity determination system 26 is a function of the change in velocity and crash type, or:

$$\text{Crash severity} = g(\Delta v, \text{Crash Type})$$

The function g will also vary based upon the types of sensors, locations of the sensors and the type of vehicle.

Generally, therefore, for a given crash type, the crash severity determination system 26 generates a crash severity signal which is a function of the inverse of the TCT(s) of the crash sensor(s) 30, 34. The crash severity signal is continuously variable for a given crash type from its minimum output to its maximum output. This continuously variable crash severity signal is sent to the vehicle occupant safety devices, including the airbag 36 and other active restraint 38 which in turn actuate proportionally to the crash severity signal in a continuously variable manner.

The calculation of the crash time, change in velocity and crash type may be performed in many different ways. If the crash sensor 30 is an accelerometer, the processor 28 can determine the crash time and the crash type based upon the shape of the acceleration signal from the crash sensor 30. Alternatively, or in addition, if the vehicle occupant safety system 20 includes the optional sensor 34, the determination of crash type and/or the beginning of the crash may also be based upon the signals from the optional crash sensor 34. If the second crash sensor 34 is radar, the velocity can be determined directly. Many suitable algorithms, techniques, and sensors could be utilized to implement the present invention.

FIG. 2 illustrates the output of the crash severity determination system 26 of FIG. 1 for a given crash type. As can be seen in FIG. 2, once the crash severity exceeds a minimum threshold the crash severity signal increases continuously variably, in an analog manner proportional to the crash severity. As shown in FIG. 2, this could be a linear relationship between crash severity and the crash severity output signal; however, any known continuous function could be utilized.

Thus, as can be seen in FIG. 2, a slight error in determining crash severity will only result in a slight error in the crash severity output signal, and thus only slightly affect the actuation force of the vehicle occupant safety devices. As a result, the vehicle occupant safety system 20 of the present invention is more apt to provide just the right amount of actuation force for a given crash.

In accordance with the provisions of the patent statutes and jurisprudence, exemplary configurations described above are considered to represent a preferred embodiment of the invention. However, it should be noted that the invention could be practiced otherwise than as specifically illustrated and described without departing from its spirit or scope. Alphanumeric identifiers for steps in the method claims are for ease of reference by dependent claims, and do not indicate a required sequence, unless otherwise indicated.

What is claimed is:

1. A crash determination system comprising:
    a crash sensor generating a crash signal based upon a severity of a crash, the crash determination system generating a continuously variable crash severity signal indicative of the severity of the crash based upon the crash signal, wherein the crash determination system determines a crash type, the crash severity signal being a graded uninterrupted signal inducing different intermediate values between two extremes as a function of the crash type determined by the crash determination system, wherein the crash determination system sends the crash severity signal to an occupant safety device.

2. The crash determination system of claim 1 wherein the crash signal crosses a threshold after a time period, wherein the crash severity signal is a function of the inverse of the time period.

3. The crash determination system of claim 1 wherein the crash sensor is an inertial sensor.

4. A method for determining a severity of a crash of a vehicle including the steps of:
    a. generating a crash signal in response to a crash;
    b. comparing the crash signal to a threshold;
    c. determining a time period to when the crash signal reaches the threshold;
    d. generating a crash severity signal indicative of a severity of the crash based upon the time period, the crash severity signal being a graded uninterupted signal including different intermediate values between an upper extreme and a lower extreme; and
    e. sending the crash severity signal to an analog occupant safety device.

5. The method of claim 4 further including the step of calculating the crash severity signal as a function of an inverse of the time period.

6. The method of claim 5 further including the step of determining a crash type, wherein said crash severity signal is calculated in said step d) based upon the crash type.

7. The method of claim 6 wherein the crash severity signal is continuously variable from a minimum to a maximum based upon the crash severity.

8. A method for determining a severity of a crash of a vehicle including the steps of:
    a. generating a crash signal;
    b. comparing the crash signal to a threshold;
    c. determining a time period in which the crash signal reaches the threshold;
    d. calculating a continuously variable crash severity signal representing a severity of the crash as inversely proportional to the time period, the crash severity signal being a continuously variable, graded signal including different between upper and lower values; and
    e. sending the crash severity signal to a continuously variable occupant safety device.

9. The method of claim 8 further including the step of determining a crash type, wherein said crash severity signal is calculated in said step d) based upon the crash type.

10. The method of claim 9 wherein the crash severity signal is continuously variable from a minimum to a maximum based upon the crash severity.

11. The method of claim 10 further including the step of determining a change in velocity as a function of the inverse of the time period and crash type.

12. The method of claim 11 further including the step of determining the crash severity signal in said step d) as a function of the change in velocity and crash type.

13. The method of claim 12 further including the steps of:

generating a plurality of crash signals from a plurality of sensors;

determining a time period for when each of the plurality of crash signals crosses a threshold; and calculating the crash seventy signal as a function of the inverse of each of the plurality of time periods.

14. The crash determination system of claim 1 wherein the continuously variable crash severity signal indicates a level at which an active restraint should be deployed.

* * * * *